United States Patent
Wright

(10) Patent No.: US 8,985,210 B2
(45) Date of Patent: Mar. 24, 2015

(54) METHODS OF SEVERING AN OBJECT FROM THE OUTSIDE USING HEAT EVOLVED FROM AN EXOTHERMIC REACTION

(75) Inventor: Adam D. Wright, Al Khobar (SA)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 13/523,228

(22) Filed: Jun. 14, 2012

(65) Prior Publication Data

US 2013/0112320 A1    May 9, 2013

Related U.S. Application Data

(63) Continuation of application No. PCT/US2011/059266, filed on Nov. 4, 2011.

(51) Int. Cl.
*E21B 29/00* (2006.01)
*B23K 23/00* (2006.01)
*B23K 7/00* (2006.01)

(52) U.S. Cl.
CPC .............. *B23K 7/00* (2013.01); *B23K 2201/32* (2013.01); *B23K 23/00* (2013.01); *B23K 2201/06* (2013.01)
USPC ............. 166/298; 166/297; 166/55; 166/376; 148/194

(58) Field of Classification Search
CPC ...... B23K 2201/32; B23K 23/00; B23K 7/00; B23K 2201/06
USPC .......... 166/298, 376, 55.2, 55.6, 55, 297, 63, 166/54.5; 148/194; 102/331, 293; 175/4.6
See application file for complete search history.

(56) References Cited

U.S. PATENT DOCUMENTS

| | | | |
|---|---|---|---|
| 4,298,063 A | 11/1981 | Regalbuto et al. | |
| 4,315,797 A | 2/1982 | Peppers | |
| 4,559,890 A | 12/1985 | Regalbuto et al. | |
| 4,598,769 A | 7/1986 | Robertson | |
| 5,509,480 A | 4/1996 | Terrell et al. | |
| 6,186,226 B1 | 2/2001 | Robertson | |
| 6,598,679 B2 | 7/2003 | Robertson | |
| 8,020,619 B1 * | 9/2011 | Robertson et al. | 166/297 |
| 2006/0266551 A1 * | 11/2006 | Yang et al. | 175/4.6 |
| 2008/0236830 A1 | 10/2008 | Fuhst et al. | |
| 2010/0044045 A1 | 2/2010 | Palmer | |

\* cited by examiner

*Primary Examiner* — Yong-Suk (Philip) Ro
(74) *Attorney, Agent, or Firm* — Anthony Iannitelli; Sherri Higgins Law; Sherri Higgins

(57) ABSTRACT

A method of severing at least a first object comprises: positioning a severing device adjacent to the first object, wherein the first object is a wireline or a tubular, and wherein the severing device comprises: a first reactant, and a second reactant; initiating a reaction, or allowing a reaction to occur, between the first reactant and the second reactant, wherein the reaction is an exothermic reaction, and wherein heat evolved from the reaction has a temperature greater than or equal to the melting point of the first object; and directing at least a portion of the heat from the outside of the first object through the first object.

26 Claims, 2 Drawing Sheets ical Field

METHODS OF SEVERING AN OBJECT FROM THE OUTSIDE USING HEAT EVOLVED FROM AN EXOTHERMIC REACTION

CROSS-REFERENCE TO RELATED APPLICATION

This application is a continuation of International Application No. PCT/US11/59266, filed Nov. 4, 2011.

TECHNICAL FIELD

Methods of severing at least a first object are provided. The object can be a tubular or a wireline. In certain embodiments two or more objects are severed. The objects can be severed via heat evolved from an exothermic reaction between a first reactant and a second reactant. The exothermic reaction can be a thermite reaction. According to an embodiment, the heat from the reaction is directed to the outside of the object such that the object is severed from the outside-in.

SUMMARY

According to an embodiment, a method of severing at least a first object comprises: positioning a severing device adjacent to the first object, wherein the object is a tubular or a wireline, and wherein the severing device comprises: a first reactant, and a second reactant; initiating a reaction, or allowing a reaction to occur, between the first reactant and the second reactant, wherein the reaction is an exothermic reaction, and wherein heat evolved from the reaction has a temperature greater than or equal to the melting point of the first object; and directing at least a portion of the heat from the outside of the first object through the first object.

BRIEF DESCRIPTION OF THE FIGURES

The features and advantages of certain embodiments will be more readily appreciated when considered in conjunction with the accompanying figures. The figures are not to be construed as limiting any of the preferred embodiments.

DETAILED DESCRIPTION

Figure 1:
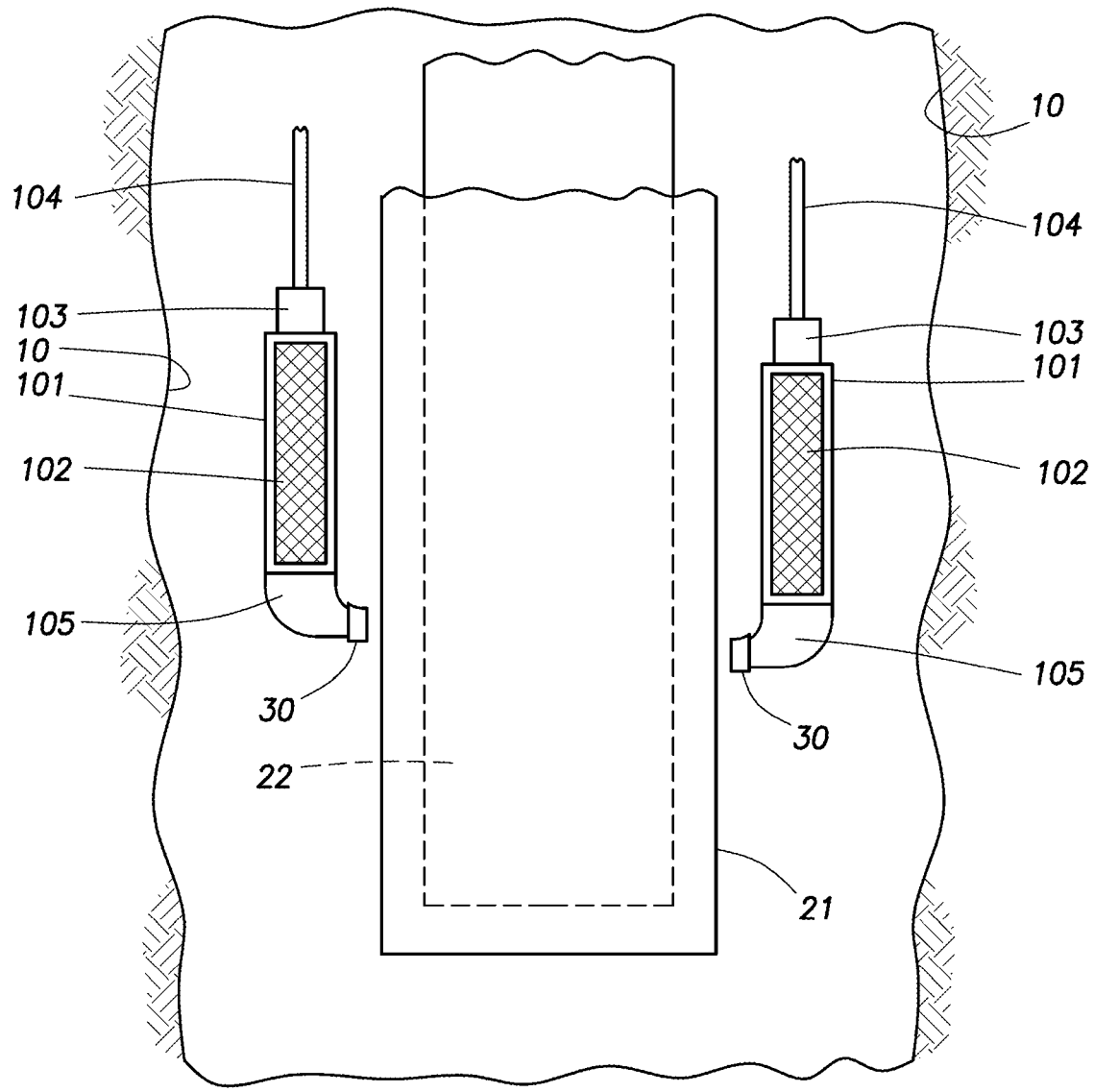
FIG. 1 is a diagram of a severing device according to an embodiment.

As used herein, the words "comprise," "have," "include," and all grammatical variations thereof are each intended to have an open, non-limiting meaning that does not exclude additional elements or steps.

It should be understood that, as used herein, "first," "second," "third," etc., are arbitrarily assigned and are merely intended to differentiate between two or more tubulars, steps, etc., as the case may be, and does not indicate any sequence. Furthermore, it is to be understood that the mere use of the term "first" does not require that there be any "second," and the mere use of the term "second" does not require that there be any "third," etc.

Oil and gas hydrocarbons are naturally occurring in some subterranean formations. A subterranean formation containing oil or gas is sometimes referred to as a reservoir. A reservoir may be located under land or off shore. Reservoirs are typically located in the range of a few hundred feet (shallow reservoirs) to a few tens of thousands of feet (ultra-deep reservoirs).

In order to produce oil or gas, a well is formed. A well can include, without limitation, an oil, gas, or water production well, or an injection well. A well includes a wellbore, that is drilled in to or adjacent to a reservoir. Drilling and completion operations can include the use of a wireline, coiled tubing, and/or tubing strings. As used herein, the term "wireline" refers to single-strand or multi-strand wire or cable and may also contain electrical conductors, commonly used in oil or gas operations. An example of a single-stranded wireline is generally referred to as a slickline. A wireline that includes an electrical conductor is generally referred to as an electric line or e-line. A wireline can also be multiple strands of metal cable. Coiled tubing refers to metal piping that is spooled on a large reel. Coiled tubing can be used for a variety of operations, including circulating or pumping fluids in a wellbore, drilling operations, logging and perforating, and production of oil, gas, or water. A tubing string refers to multiple sections of pipe connected to each other. A tubing string is created by joining multiple sections of pipe together via joints. Tubing strings can also be used in drilling and completion operations.

It may be necessary to sever or cut through an object such as a wireline or a tubular. As used herein, the word "tubular" means a pipe. A "tubular" can include, but is not limited to, coiled tubing or a tubing string. One example of when it may be necessary to cut through a tubular is when a formation kick occurs. A kick can occur when formation fluids (e.g., liquid and/or gas) prematurely enter a portion of the wellbore, for example, in an annular space of the wellbore. Prior to production, a sufficient hydrostatic pressure must be exerted on the subterranean formation in order to prevent formation fluids from prematurely entering the wellbore. Hydrostatic pressure is the pressure exerted by a fluid at equilibrium due to the force of gravity. If the hydrostatic pressure exerted on the formation is not great enough, then a kick could occur.

There are several devices that can be used to cut through a wireline or tubular. Some devices use a mechanical means of cutting and some devices use a chemical means of cutting. Some examples of mechanical cutters include a blowout preventer (BOP) and a cutting ball valve. These mechanical cutters can be designed to cut through one or more tubulars and also provide a pressure barrier. For example, in the case of a sealing shear ram BOP, two hardened steel shears can be activated which cut through the entire circumference of one or more tubulars. After the tubulars have been cut, the shears can close together, thus creating a pressure barrier in that portion of the wellbore. By creating a pressure barrier, a blowout may be prevented. However, it is not uncommon for some mechanical cutters to fail because the amount of pressure required for the cutter to achieve the full stroke and cut through the entire circumference of the tubular can be quite high. Moreover, if the pressure barrier does not form, or fails after formation, then workers could be at risk of injury.

An example of a chemical means of cutting is the use of acids to "eat" through the tubular. Another example of a chemical means is the use of reactants that undergo an exothermic reaction to form products. In an exothermic reaction, the total amount of energy required for the reaction to occur is less than the total amount of energy in the system. As a result, energy, in the form of heat and/or light, is released. Once started, an exothermic reaction will continue to release heat or light until at least one of the reactants is consumed, so long as no interference occurs. In order to sever a tubular, the heat produced from an exothermic reaction would need to be greater than or equal to the melting point of the particular elemental metal or metal alloy that the tubular is made from. For example, if the tubular is made from a steel alloy, then the exothermic reaction would need to produce heat at a temperature of approximately 2,500° F. (1,370° C.), depending on the relative concentrations of each of the elemental metals making up the alloy, in order to cut through the tubular.

An example of an exothermic reaction that has been used to sever a tubular is called a thermite reaction. A thermite reaction is an exothermic oxidation-reduction reaction involving thermite. Thermite is a blend of a metal, called a fuel, and an oxide. The oxide is commonly a metal oxide. Some examples of fuels include, but are not limited to, aluminum, magnesium, calcium, titanium, zinc, silicon, and boron, with aluminum being the most common. Some examples of metal oxides include, but are not limited to, boron (III) oxide, silicon (IV) oxide, chromium (III) oxide, manganese (IV) oxide, iron (II or III) oxide, copper (II) oxide, and lead (II, III, or IV) oxide. The reactants are most often ground into a powder and then mixed with a binder to keep the reactants mixed together. The reactants/binder mixture is often a solid. An example of a thermite reaction using iron (III) oxide and aluminum is shown below.

$Fe_2O_3 \rightarrow 2Al\ 2Fe+Al_2O_3$

Thermite reactants generally require extremely high temperatures in order to initiate the thermite reaction. It is estimated that an average temperature of at least 1,200° F. (650° C.) is needed in order to initiate a thermite reaction. The initiation temperature can vary depending on the particle size of the reactants and the specific reactants used. Fuses, such as strips of metal that have been ignited, can be used to initiate a thermite reaction. Another common technique for initiation of a thermite reaction is to use the heat produced from another exothermic reaction, such as the reaction between potassium permanganate and glycerol or ethylene glycol, to initiate the thermite reaction. It is helpful for the chosen reactive metal (the fuel) to have a low melting point and high boiling point, relative to other metals. By having a low melting point, the fuel melts at a lower temperature, enabling the reaction to occur in a liquid phase. A liquid phase fuel allows the reaction to proceed fairly quickly. The lower the melting point of the reactive metal, the lower the required initiation temperature. Moreover, a high boiling point allows the reaction to reach very high temperatures.

The thermite reaction produces extremely hot metal liquids. Upon initiation, thermite reactants burn and can produce temperatures well in excess of 3,800° F. (2,100° C.). Moreover, a thermite reaction does not need an external source of oxygen to burn. Therefore, once started, a thermite reaction will continue to produce heat until at least one of the reactants has been consumed.

It is desirable to have a cutting system that quickly and easily severs an object, such as a wireline or a tubular, from the outside-in using heat produced from an exothermic reaction. Preferably the cutting system is capable of severing two or more objects. The object can be located in a portion of a subterranean formation, for example in a wellbore.

According to an embodiment, a method of severing at least a first object comprises: positioning a severing device adjacent to the first object, wherein the object is a wireline or a tubular, and wherein the severing device comprises: a first reactant, and a second reactant; initiating a reaction, or allowing a reaction to occur, between the first reactant and the second reactant, wherein the reaction is an exothermic reaction, and wherein heat evolved from the reaction has a temperature greater than or equal to the melting point of the first object; and directing at least a portion of the heat from the outside of the first object through the first object.

Any discussion of a particular component of the severing device (e.g., a nozzle) is meant to include the singular form of the component and also the plural form of the component, without the need to continually refer to the component in both the singular and plural form throughout. For example, if a discussion involves "the nozzle," it is to be understood that the discussion pertains to one nozzle (singular) and two or more nozzles (plural). It is also to be understood that any discussion of a particular component or particular embodiment regarding a component is meant to apply to all of the method embodiments without the need to re-state all of the particulars for each method embodiment.

Turning to the Figures. FIG. 1 is a diagram of the severing device. The methods include the step of positioning the severing device adjacent to the first object. The object can be a wireline or a tubular. It is to be understood that any discussion below pertaining to a "first tubular" could also be the alternative of a "first wireline" without having to specify the wireline alternative in every instance throughout. It is also to be understood that a "second tubular" can also be a "second wireline." If there is more than one object to be severed, it is also to be understood that the first object can be a first wireline and the second object can be a second tubular and vice versa. The first tubular 21 can be located in a wellbore 10. The wellbore 10 can be part of an oil, gas, or water production well, or an injection well. There can also be more than one object. For example, there can be a second tubular 22, a third tubular (not shown), and so on. The severing device can also be positioned adjacent to the second tubular 22 and/or other tubulars. According to an embodiment, the tubulars are severed from the outside-in. According to this embodiment, the second tubular 22 (and all other additional tubulars) are positioned inside the first tubular 21. For example, if there is a total of three tubulars, then the third tubular can be positioned inside the second tubular 22, and the second tubular 22 can be positioned inside the first tubular 21. The tubulars can be coiled tubing or a tubing string. According to another embodiment, if the first object is a wireline and the second object is a tubular, then the wireline can be positioned along the outside of the tubular. In this example, the severing device is positioned adjacent to the wireline and tubular such that both, the wireline and the tubular, are severed from the outside-in. By way of yet another example, the first object can be a tubular and the second object can be a wireline. In this example, the wireline can be located inside the tubular and the severing device can be positioned adjacent to the tubular such that both, the tubular and wireline, are severed from the outside-in. The step of positioning can be suspending the severing device adjacent to the first tubular 21.

The severing device includes a first reactant and a second reactant. As used herein, the term "reactant" means a starting substance in a chemical reaction. According to an embodiment, the first and second reactant are capable of undergoing an exothermic reaction whereby the heat evolved from the reaction has a temperature greater than or equal to the melting point of the first object. According to another embodiment, the heat evolved from the reaction has a temperature of at least 2,000° F. (1,100° C.), alternatively at least 3,000° F. (1,650° C.), or alternatively 4,000° F. (2,200° C.). The reaction can be a thermite reaction. The first reactant and second reactant can produce a metal liquid that has a specific temperature. The temperature of the metal liquid can be the heat evolved from the reaction. Accordingly, the metal liquid has a temperature greater than or equal to the first object. The metal liquid can also have a temperature of at least 2,000° F. (1,100° C.), alternatively at least 3,000° F. (1,650° C.), or alternatively 4,000° F. (2,200° C.).

The first reactant can be a solid. The first reactant can be an elemental metal or a metal alloy. The first reactant can comprise a reactive metal. As used herein, the term "reactive metal" means a metal element that can undergo a chemical reaction, forms cations, and forms ionic bonds with a compound containing a non-metal (e.g., oxygen, hydrogen, or nitrogen). A metal can be described as an element that is usually: a solid at a temperature of 71° F. (21.7° C.); a good conductor of electricity and heat; and appears lustrous. The reactive metal can be an alkali metal, an alkaline earth metal, a transition metal, the metals listed in groups 13 through 15 of a periodic table, and metalloids. Examples of reactive metals include, but are not limited to, radium, germanium, beryllium, lithium, sodium, potassium, magnesium, calcium, strontium, barium, zinc, molybdenum, cadmium, titanium, chromium, manganese, iron, cobalt, nickel, copper, palladium, silver, gold, aluminum, tin, lead, boron, and silicon.

According to an embodiment, the first reactant has a melting point less than or equal to 1,850° F. (1,000° C.), alternatively 1,475° F. (800° C.). The first reactant can have a boiling point greater than or equal to 3,200° F. (1,700° C.). The first reactant can also have a boiling point in the range of about 3,200° F. to about 6,500° F. (about 1,700° C. to about 3,600° C.). Examples of elemental metals that have melting points and boiling points within the parameters of the preceding sentences include, but are not limited to, silicon, cobalt, nickel, iron, gold, germanium, tin, copper, aluminum, beryllium, silver, manganese, barium, lead, radium, and calcium.

The severing device also comprises a second reactant. The second reactant can be a solid. In order to react with the first reactant, preferably, the second reactant comprises a non-metal. The second reactant can be an oxide, preferably a metal oxide. Examples of the second reactant include, but are not limited to, boron (III) oxide, silicon (IV) oxide, chromium (III) oxide, manganese (IV) oxide, iron (II or III) oxide, copper (II) oxide, and lead (II, III, or IV) oxide.

According to an embodiment, the first and second reactants are mixed with a binder. As can be seen in FIG. 1, the first and second reactants can be bound together as a solid reactant mixture 102. The ratio of the first reactant to the second reactant can be 50:50 by volume. One of skill in the art will be able to determine the ratio of the first reactant to second reactant based on the exact reactants used and their respective molar masses. The amount of binder can be an amount sufficient to bind the reactants together. The total volume of the reactant mixture 102 used can be determined based on the specifics of a given operation. One of skill in the art can determine the total volume of reactant mixture 102 needed based on at least some of the following considerations: the type of material the objects (e.g., the first tubular 21, the second tubular 22, the wireline, etc.) are made from; the wall thickness of the tubulars (or the thickness of the wireline); and the total number of objects to be severed.

The severing device can further include a reactant reservoir 101. According to an embodiment, the first reactant is located within the reactant reservoir 101. According to this embodiment, the second reactant can be located in a separate reservoir (not shown). The second reactant can be introduced into the reactant reservoir 101 in order for the reaction to proceed. According to another embodiment, the second reactant can also be located in the reactant reservoir 101. For example, if the first and second reactants are bound together as a reactant mixture 102, then the reactant mixture 102 can be located in the reactant reservoir 101.

Preferably, the size of the reactant reservoir 101 is sufficient to hold at least the first reactant, the first and second reactants, or the reactant mixture 102. The reactant reservoir 101 can be made from a variety of materials and/or lined with a variety of materials. The material is preferably capable of withstanding the heat evolved from the reaction. As used herein, the term "withstanding" means the material does not melt, burn, or become deformed in any manner, such as becoming punctured or warped. The actual amount of heat evolved will vary depending on the total volume of the reactants used and the specific reactants selected. Examples of metals that may be capable of withstanding the heat evolved from the reaction include, but are not limited to, carbon, tungsten, rhenium, osmium, tantalum, or molybdenum. Carbon has the highest melting point among the list, with a melting point of approximately 7,150° F. (3,950° C.).

The severing device can further comprise an ignition device 103. The ignition device 103 can be capable of initiating the reaction between the first and second reactants. The ignition device 103 can initiate the reaction, for example, by producing a temperature greater than or equal to the melting point of the first reactant. According to this example, the ignition device 103 can be a fuse, such as a strip of magnesium metal, that is capable of igniting and producing a sufficient amount of heat to initiate the reaction. The ignition device 103 can also initiate the reaction by producing an exothermic chemical reaction between two reactants, such as between potassium permanganate and glycerol or ethylene glycerol. The severing device can also include an ignition device activator 104. The ignition device activator 104 can be used to activate the ignition device 103. For example, if the ignition device 103 is a fuse, then the ignition device activator 104 can include a means for lighting the fuse. By way of another example, if the ignition device 103 is an exothermic chemical reaction, then the ignition device activator 104 can be used to comingle the two reactants with each other such that the reaction commences.

The methods include the step of initiating the reaction, or allowing the reaction to occur, between the first reactant and the second reactant, wherein the reaction is an exothermic reaction. The reaction can be initiated via the ignition device 103. For example, the reaction can be initiated by lighting an ignition device 103, when the ignition device 103 is a fuse. If the first and second reactants are capable of commencing the chemical reaction without external intervention, then the methods include the step of allowing the reaction to occur.

According to an embodiment, the heat evolved from the reaction has a temperature greater than or equal to the melting point of the first object. According to another embodiment, the heat evolved from the reaction has a temperature of at least 2,000° F. (1,100° C.), alternatively at least 3,000° F. (1,650° C.). The heat evolved from the reaction can also have a temperature in the range of about 2,000° F. to about 6,500° F. (about 1,100° C. to about 3,600° C.). If there is more than one object, then preferably, the heat evolved is also greater than or equal to the melting point of the second object, and the third object, and so on. Preferably, the heat evolved is a sufficient temperature such that at least the first object is severed. The heat evolved can also be a sufficient temperature such that two or more object are severed. The heat evolved can also be a sufficient temperature such that all objects located adjacent to the severing device are severed.

The methods include the step of directing at least a portion of the heat from the outside of the first object through the first object. The step of directing can include directing at least a portion of a metal liquid produced from the reaction from the outside of the first object through the first object. Preferably, the first object is completely severed by the heat from the reaction. By way of example, if the first object is a tubular, then preferably the heat travels from the outside of the tubular, through the wall of the tubular, and all the way to the outside of the other side of the tubular, such that the tubular is completely severed. By way of another example, if the first object is a wireline, then preferably the heat travels from the outside of the wireline, through the inside of the wireline, and to the other side such that the wireline is completely severed.

The severing device can further include a nozzle 105. The nozzle 105 can be directly or operatively connected to the reactant reservoir 101. Preferably, the heat being evolved from the reaction is forced into the nozzle 105. The heat can be forced, for example, by including a stopper at the end of the reactant reservoir 101 that is opposite from the nozzle 105. In this manner, the heat will be forced to flow into the nozzle 105 instead of flowing out of both ends of the reactant reservoir 101. The nozzle 105 can then direct the heat from the reaction to a specific area on the outside of the first tubular 21. According to an embodiment, the ratio of the inside diameter of the cutting device to the outside diameter of the object is predetermined to yield the most effective cutting of the object. The exit of the nozzle 105 is preferably located as close to the outside of the first tubular 21 as possible. The closeness of the exit of the nozzle 105 can be used to allow the heat evolved from the reaction to contact the outside of the first tubular 21 without being disrupted from wellbore fluids and/or pressures.

Figure 2:
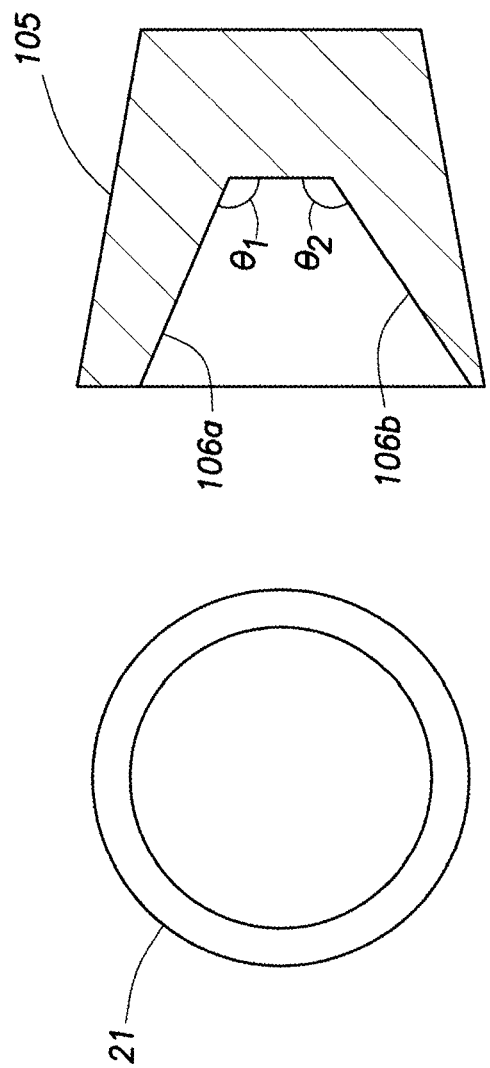
FIG. 2 is a diagram of a nozzle of the severing device.

As can be seen in FIG. 2, the nozzle 105 can include one or more directors 106a and 106b. The directors 106a and 106b can be adjustable. The directors 106a and 106b can be adjusted such that the angles $\theta_1$ and $\theta_2$ are the same or different. Each director can be designed or adjusted to provide a heat exit of varying widths. Preferably, the exit width is at least sufficient such that the heat, upon exiting the nozzle 105, contacts the entire outer diameter on the outside wall of the first tubular 21. The heat, can then start melting the first tubular 21 in a direction from the outside of the wall to the inside of the wall (outside-in). If there is a second tubular 22, then after the heat has severed the first tubular 21, the heat will start melting the wall of the second tubular 22 from the outside-in. In an embodiment, the heat is sufficient to completely sever the first tubular 21. Preferably, the heat is sufficient to completely sever two or more tubulars.

The nozzle 105 and directors 106a and 106b can be made from a variety of materials. In a preferred embodiment, the material is capable of withstanding the heat evolved from the exothermic reaction. If the nozzle 105 is operatively connected to the reactant reservoir 101, then any intermediary connections can be made from a material capable of withstanding the heat evolved from the exothermic reaction. Examples of metals that may be capable of withstanding the heat evolved from the reaction include, but are not limited to, carbon, tungsten, rhenium, osmium, tantalum, or molybdenum.

There can be more than one severing device. For example, and as shown in FIG. 1, a first severing device can be located on one side of the first tubular 21 and a second severing device can be located on a side away from the first severing device. The devices can be located opposite each other or in other arrangements around the outside of the first tubular 21. The arrangement of the devices can be determined to yield the most efficient severing of the objects.

The severing device can further include a barrier 30. The barrier 30 can be used to prevent fluids from entering the nozzle 105. For example, the barrier 30 can be designed to fit over the exit of the nozzle 105 and seal the exit. The barrier 30 can be made from a variety of materials. In a preferred embodiment, the material is incapable of withstanding the heat evolved from the exothermic reaction. In this manner, as the reaction proceeds and the heat is evolved, the heat can be channeled down the nozzle 105. The heat can then melt the barrier 30 and now, the heat evolved from the reaction can contact the outside of the first object. Examples of materials that may be incapable of withstanding the heat evolved from the reaction include, but are not limited to, polymeric materials such as elastomers or plastics, mercury, francium, caesium, gallium, rubidium, potassium, sodium, indium, or lithium.

The methods can further include the step of removing the top portion of the object after the step of directing. As used herein, the term "top portion" refers to the part of the object located above the cut. The severing device can be located near a blow-out preventer (BOP). The BOP can include plates that are capable of closing to seal off the wellbore. The severing device can be located near the BOP such that after the step of directing (and preferably, at least the first object is severed), the plates of the BOP can simply close and do not have to cut through any of the objects located in that portion of the wellbore. The methods can further include the step of causing or allowing the plates of a BOP to close.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a to b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A method of severing at least a first object comprising:
    positioning a severing device in a wellbore adjacent to the first object,
        wherein the first object is a tubular, and
        wherein the severing device comprises:
            a first reactant, and
            a second reactant;
    initiating a reaction, or allowing a reaction to occur, between the first reactant and the second reactant,
        wherein the reaction is an exothermic reaction, and
        wherein heat evolved from the reaction has a temperature greater than or equal to the melting point of the first object; and directing at least a portion of the heat from the outside of the first object through the first object.

2. The method according to claim 1, further comprising a second object.

3. The method according to claim 2, wherein the second object is a tubular, and wherein the second object is positioned inside the first object.

4. The method according to claim 3, further comprising directing at least a portion of the heat from the outside of the first object and second object through the first object and second object.

5. The method according to claim 4, wherein both the first object and second object are severed via the directed portion of the heat.

6. The method according to claim 2, wherein the second object is a wireline, and wherein the second object is positioned inside the first object or along the outside of the first object.

7. The method according to claim 6, further comprising directing at least a portion of the heat from the outside of the first object and second object through the first object and second object.

8. The method according to claim 7, wherein both the first object and second object are severed via the directed portion of the heat.

9. The method according to claim 1, wherein the reaction is a thermite reaction.

10. The method according to claim 1, wherein the first reactant comprises a reactive metal.

11. The method according to claim 1, wherein the first reactant has a melting point less than or equal to 1,850° F. (1,000° C.).

12. The method according to claim 1, wherein the first reactant has a boiling point in the range of about 3,200° F. to about 6,500° F. (about 1,700° C. to about 3,600° C.).

13. The method according to claim 1, wherein the first reactant comprises a metal selected from the group consisting of silicon, cobalt, nickel, iron, gold, germanium, tin, copper, aluminum, beryllium, silver, manganese, barium, lead, radium, calcium, and combinations thereof.

14. The method according to claim 1, wherein the second reactant is a metal oxide.

15. The method according to claim 14, wherein the second reactant is selected from the group consisting of boron (III) oxide, silicon (IV) oxide, chromium (III) oxide, manganese (IV) oxide, iron (II or III) oxide, copper (II) oxide, lead (II or IV) oxide, and combinations thereof.

16. The method according to claim 1, wherein the ratio of the first reactant to the second reactant is 50:50 by volume.

17. The method according to claim 1, wherein the severing device further comprises an ignition device.

18. The method according to claim 17, wherein the ignition device initiates the reaction between the first and second reactants.

19. The method according to claim 18, wherein the ignition device is a fuse.

20. The method according to claim 19, wherein the step of initiating comprises lighting the ignition device.

21. The method according to claim 1, wherein the heat evolved from the reaction has a temperature of at least 2,000° F. (1,100° C.).

22. The method according to claim 1, wherein the severing device further comprises a reactant reservoir.

23. The method according to claim 22, wherein the severing device further comprises a nozzle, and wherein the nozzle is directly or operatively connected to the reactant reservoir.

24. The method according to claim 23, wherein the nozzle is made from a material selected from the group consisting of carbon, tungsten, rhenium, osmium, tantalum, molybdenum, and combinations thereof.

25. The method according to claim 1, further comprising a barrier.

26. The method according to claim 1, wherein the first object is severed via the directed portion of the heat.

* * * * *